(No Model.)
A. E. KREBS.
COMBINED TAPE MEASURE AND SQUARE.
No. 530,111. Patented Dec. 4, 1894.
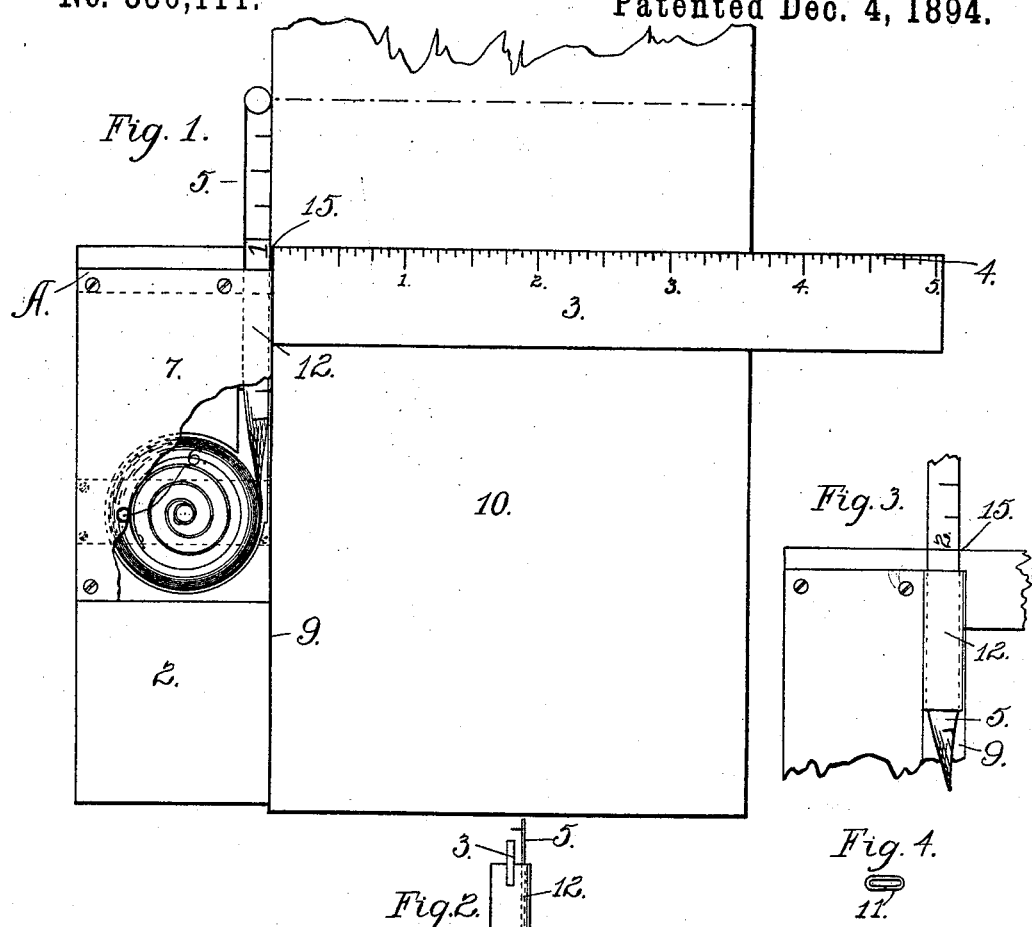
Witnesses:
F. G. Bradbury
W. C. Swift
Inventor:
August E. Krebs
per: T. D. Murwin
Attorney.

UNITED STATES PATENT OFFICE.

AUGUST E. KREBS, OF ST. PAUL, MINNESOTA.

COMBINED TAPE-MEASURE AND SQUARE.

SPECIFICATION forming part of Letters Patent No. 530,111, dated December 4, 1894.

Application filed February 13, 1894. Serial No. 499,995. (No model.)

*To all whom it may concern:*

Be it known that I, AUGUST E. KREBS, of St. Paul, Ramsey county, Minnesota, have invented certain Improvements in a Combined Tape-Measure and Square, of which the following is a specification.

My invention relates to improvements in tape measures and squares, its object being to so combine the tape measure and square that the combined tool may have many advantages in use over either or both tools used separately.

To this end my invention consists in inclosing in the handle of a carpenter's try square an automatically retracting tape measure from which the tape may be drawn, from the upper corner adjacent to the blade of the handle, along the material to which the square may be applied, either by securing the end of the tape at the fixed point and drawing the square therefrom, or by placing the square and drawing the tape; in either case there being the advantage of having, as a part of the tool, the edge of the square positioned for guiding the distance mark to be made upon the material.

In the accompanying drawings forming part of this specification: Figure 1 is a plan view of the try square applied to a straight edged stock piece, the handle of the square being broken away sufficiently to show the inclosed tape measure from which a short length of tape may be seen extended. Fig. 2 is a side elevation of the handle of the try square, showing in dotted lines, the position of the tape measure therein. Fig. 3 is a detail view, showing portions of the try square and tape, and the guide therefor located in the handle of the square. Fig. 4 is an end view of the tape guide. Figs. 5 and 6 are plan and elevation of the end of the tape and of the thumb tack secured therein adapted to be pressed into the object at that point from which the operator measures. Fig. 7 is a plan view of the end of the tape having therein an eyelet, through which the point of a thumb tack may be passed into a stock piece. Fig. 8 is an elevation of the tack used with the eyelet. Figs. 9 and 10 are side elevations of the thumb tack and hinged guard for same, open and closed; and Figs. 11 and 12 are front elevations of same.

The square A, into the handle 2 of which the tape measure B is placed, is of the usual construction, having rigidly or adjustably secured in one end the blade 3, generally stamped with a scale 4.

The tape measure B is preferably of that class in which the tape 5, as withdrawn, has no tendency to retract, unless a small button 6 be depressed. The tape measure is flushly set into the try square handle so that this retraction button may still be used in the combined tool. The tape measure is also set with its periphery close to that edge 9 of the handle which is applied to objects, in order that the tape, as withdrawn, shall be parallel with the edge of the object 10 to be measured, and at the same time, at right angles with the square blade, from or to which the operator generally measures. The tape twists one quarter of a revolution as it passes from the case to the opening in the handle, so that the web may be in the same plane as the square blade. The folded guide 11 for the tape is set in the handle at 12.

Three forms of thumb tacks, 13, 14 and 18 are used for fastening the end of the tape at any point from which a length is to be ascertained and set off. These are of advantage, since the square can then be moved along the stock piece 10 with one hand, while the other will be free to mark the lengths, or series of lengths, as they are observed on the tape scale at 15 at the marking edge of the blade 3. The tack 13 is T shaped, having its cross wrapped in the end of the tape. The tack 14, having a flat head, is adapted to be pressed through the eyelet 19 in the web of the tape; and the tack 18, set in the member 17 of a hinged guard secured to the end of the tape, is covered when not in use by the other member 16, leaving the ring 20 in position for grasping.

The tape measure in no wise interferes with the ordinary use of the square, as, when not in use, the tape is reeled into its case in the try square handle, with only the ring at the end of the tape projecting so that it can be conveniently grasped.

I claim—

A combined try square and measure consisting of the square, a reel carrying a tape located in the handle of the square with the periphery of the reel situated to bring the tape parallel with the edge of the object to be measured and at right angles with the square blade, and a guide located in the handle and adapted to change the plane of the tape after leaving the reel to bring it into the same plane as the square blade, substantially as and for the purposes described.

In testimony whereof I have hereunto set my hand this 31st day of January, 1894.

AUGUST E. KREBS.

Witnesses:
H. S. JOHNSON,
W. C. SWIFT.